United States Patent
Atchley

[11] 3,771,496
[45] Nov. 13, 1973

[54] DEMAND DELIVERY PUMP FOR SMALL ANIMALS

[76] Inventor: Frank William Atchley, 1106 Hardman Ave., Napa, Calif. 94558

[22] Filed: Oct. 26, 1971

[21] Appl. No.: 167,703

[52] U.S. Cl. ............................. 119/72.5, 119/75
[51] Int. Cl. .......................................... A01k 07/00
[58] Field of Search ................ 119/71, 75, 72.5; 137/513.5

[56] References Cited
UNITED STATES PATENTS

| | | | |
|---|---|---|---|
| 1,918,566 | 7/1933 | Sadleir | 119/72.5 |
| 2,028,265 | 1/1936 | Winnen | 137/513.5 X |
| 2,034,968 | 3/1936 | Bartlett | 119/72.5 |
| 3,303,824 | 2/1967 | Anderson | 119/72.5 |
| 3,385,267 | 5/1968 | Boegli et al. | 119/72.5 |
| 3,537,430 | 11/1970 | Peppler | 119/72.5 |

FOREIGN PATENTS OR APPLICATIONS

| 1,129,017 | 10/1968 | Great Britain | 119/72.5 |
|---|---|---|---|

Primary Examiner—Louis G. Mancene
Assistant Examiner—James H. Czerwonky
Attorney—James R. Cypher

[57] ABSTRACT

A pump device for dispensing water to create and small animals. The device comprises a tube body attached to a bottle container with a resilient closure and having a ball control adapted to close off, but not mechanically seal, the tube end opening and to control fluid flow by piston action and augmentation of liquid surface tension phenomena. A vacuum is maintained in the bottle and a meniscus is formed at the outlet end of the tube with the control ball. Normally water will flow only when the control ball is manually forced away from the outlet end. Pressure relief means, formed at the outlet end of the tube, has means to space the control ball from a portion of the outlet to prevent a mechanical seal therebetween and to relieve excessive pressure build-up in the bottle.

9 Claims, 5 Drawing Figures

PATENTED NOV 13 1973 3,771,496
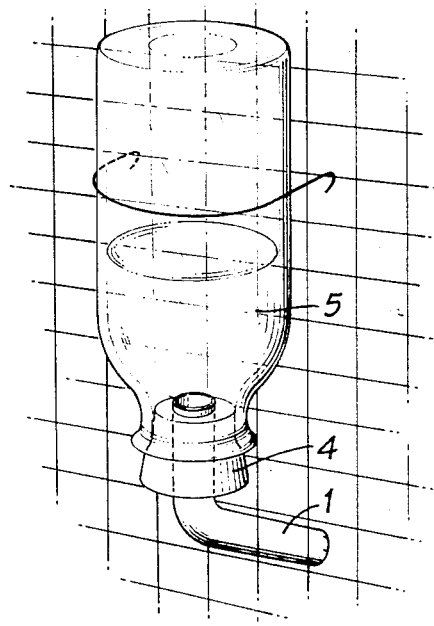
FIG_2
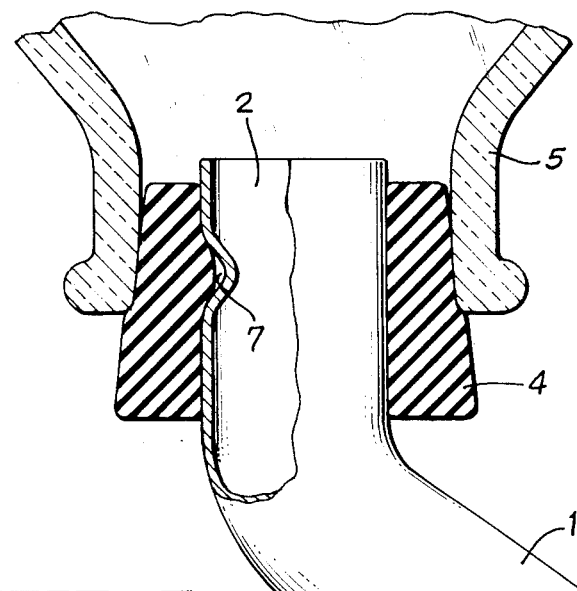
FIG_1
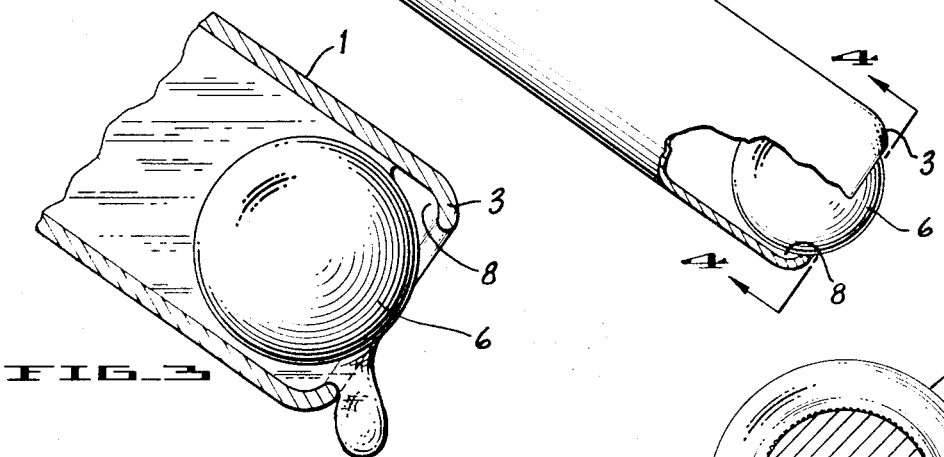
FIG_3
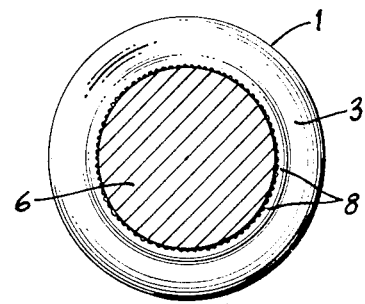
FIG_4
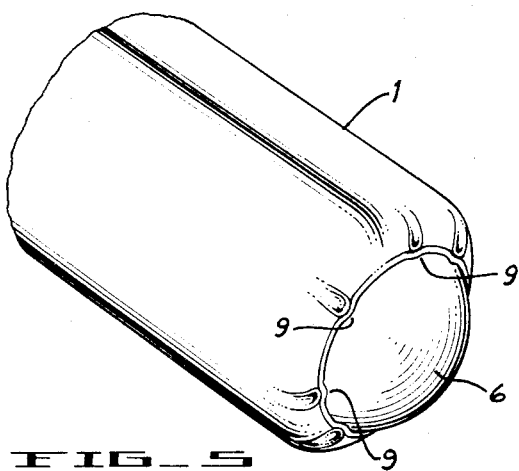
FIG_5

DEMAND DELIVERY PUMP FOR SMALL ANIMALS

BACKGROUND OF THE INVENTION

The traditional method of watering small animals, as mice, rats, and hamsters, is with an open end drinking tube affixed to a bottle container with a resilient closure. The attending problems of drippage, leakage, and unavoidable backflow of contamination up into the bottle using open tubes are common knowledge. Heretofore nothing better has been available.

A typical open tube watering unit functions in an inverted position with the open tube end projecting into the animal's cage. Drainage out of the bottle is prevented by a meniscus surface which bridges the tube end and by a partial vacuum inside the bottle. The animals drink by touching the meniscus surface with their tongue or teeth. Water droplets adhere to their tongue or teeth which they extract and drink. As they drink, air bubbles form at the tube tip and rise upward into the bottle to maintain vacuum equilibrium. These air bubbles, via force of surface tension, forcefully extract, collect, and transfer nutrients and contaminants (food particles and bacteria) from the animal's mouth up into the bottle every time the animal drinks. The result is cumulative degradation of water quality, decline in effective chlorination, and rapid growth of algae and bacteria. These changes necessitate the costly practice of frequent water change and cyclic sterilization of the bottles, stoppers, and tubes.

In addition, with open end drinking tubes, there are problems of continual drippage from air expansion inside the bottle on diurnal temperature increase and of sloshing and spillage during bottle handling. There is also unavoidable hazard of wick-action capillary drainage of the bottle contents when piled-up bedding or animal fur accidentally touches the open tube tip.

The prior art reveals numerous attempts to provide a substitute for the traditional open tube watering unit: Fredericksen U.S. Pat. Nos. 2,726,636, Fredericksen 2,678,630, Grassano 3,228,377, and Holmes 1,454,284. However, all such devices employ gravity or pressure as the driving force for fluid flow and control the fluid flow with a valve seal mechanism or arrangement. When the valve mechanism is actuated the water flow is continuous. Further, all these prior devices neglect provision for attracting and training the animal. The training difficulty and the potential for malfunction and continuous fluid flow has made such devices generally unacceptable.

SUMMARY

This invention utilizes a nonsealing, rollable, deflectable control ball inside a tube body for delivery of fluid to small animals from a bottle container. The device employs vacuum pressure and augmented force of surface tension to preclude continuous fluid flow when the control is actuated. It dispenses fluid intermittently by volumetric fluid displacement from movement and deflection of the control ball by animal licking and nudging. The device is further adapted to provide an exposed annular fluid meniscus around the control ball to aid in attracting the animal. The object of the invention is to provide an improved drinking tube for small animals that eliminates the problems of drippage, capillary drainage, and backflow of contamination that are inherent in open end drinking tubes. Another object of the invention is to overcome the deficiencies of similar prior art devices in providing means for attracting the animal and preventing continuous water flow.

BRIEF DESCRIPTION OF THE DRAWINGS:

FIG. 1 is a perspective view of the invention as it would appear attached to a typical bottle container with a resilient closure and installed in an inverted position on an animal's cage.

FIG. 2 is a partial fragmentary cut-away elevational view of the invention showing details of its attachment to a typical bottle container and the internal construction and positioning of the control ball in a closed-tube position.

FIG. 3 is a medial sectional view of the tube tip portion of the invention showing the control ball in an open tube position. This view illustrates diagramatically the fluid displacement effect of inward ball deflection.

FIG. 4 is a sectional view along cut lines 4—4 in FIG. 2, precisely at the distal end of the tube body, illustrating preferred crenulations on the interior tube wall which preclude fluid seal.

FIG. 5 is a perspective view of an alternate tube tip modification showing indentations in the tube tip wall which preclude fluid seal.

As shown in FIG. 2 the invention is comprised of a length of thin-wall tubing 1 with a full diameter opening 2 on one end and a curved, rounded tube tip 3 forming a restricted area of tube opening on the opposite end. The full open tube end 2 fits into a resilient closure 4 thence into the neck of a bottle container 5.

Disposed within the tube body 1 is a rollable, freely moveable control ball 6 detained therein by the curved tube tip 3 and by a suitable inward indentation 7 in the tube wall near the opposite end. The control ball is adapted to substantially coincide with the cross-section area of the tube interior with 0.005 × 0.010 inches tolerance. The curved tube tip end 3 is adapted to allow the control ball to protrude through and beyond the tube end opening approximately one third the ball diameter.

FIG. 4 illustrates diagrammatically that the curved tube tip end 3 is adapted with interior crenulations 8 to form an annular ring of discontinuous points of non-sealing contact with the control ball 6 in the normal closed tube position. In practice, these crenulations are of minute microscopic dimensions produced in the tube-forming process. A modification of the curved tube tip 3 showing alternate spaced indentations 9 around its periphery to accomplish the same effect as the interior crenulations 8 is shown in FIG. 5.

From inspection of the several drawings it is apparent that the control ball is not a check valve and does not provide either valve action or valve seal. Rather, it serves as a rollable body which serves to close off, but not seal, the tube interior and the tube end opening. In the normal down closed tube position, the control ball protrudes out through the tube end opening under influence of gravity. When deflected inwardly, as shown in FIG. 3, the control ball serves as a piston, or ram, within a cylinder, which displaces a proportionate volume of fluid down out of the tube which clings to the ball and is consumed by the animal. When the control ball drops back down into its normal closed-tube position, air enters through the crenulation openings and forms bubbles up inside the tube out of contact with the animal's mouth. These air bubbles then float upward into the bottle to maintain vacuum equilibrium. Continued in-and-out ball movement from animal licking results in an intermittant water release to the animal. The formation of air bubbles up inside the tube, above the control ball, effectively eliminates the problem of extraction and transfer of contaminants from the animal's mouth up into the water bottle.

From analysis of the operating principle and mechanics of the present invention, it is apparent that the control ball also serves to augment the force of surface tension at the tube tip by reducing the diameter and area of the tube end opening and by increasing the surface area of contact with the fluid. The resulting increased surface tension serves to increase the effective vacuum inside the bottle and to preclude continuous water flow out of the bottle. The resulting higher pressure differential inside the bottle, relative to open-end tubes, assists in preventing leakage and drippage from temperature and atmosphere changes.

Further analysis reveals that the control ball essentially seals off the tube end opening. This "closure" of the tube opening materially reduces sloshing and spillage during maintenance. It also eliminates the problem of "wick-action" capillary drainage when piled-up bedding or animal fur touches the tube tip.

The described crenulations 8 on the inside wall of the curved tube tip 3 allow escape of water out of the tube to compensate for air expansion inside the bottle on temperature increase, which otherwise could produce pressure build-up and render the control ball inoperable by the animal. The crenulations 8 also effectively create an exposed annular meniscus of liquid around the control ball which attracts the animal through smell and aids greatly in overcoming the animal training problem.

Thus it is shown that the present invention accomplishes the stated objectives and therein provides a valuable useful contribution to the art of animal watering devices. The invention employs mechanical function, liquid surface tension, and volumetric liquid displacement, in combination, to provide a novel new, improved drinking tube for small animals.

The detailed description in conjunction with the accompanying drawings clearly demonstrates the means, adaptations, positioning, and dimensioning of the various elements which together comprise the preferred embodiment of the present invention. It is obvious that modifications in the construction and positioning of the elements of the invention can be made without departing from the spirit and scope of the following claims.

I claim:

1. A demand delivery liquid pump dispensing device for small animals comprising:
   a. a sealed container containing a supply of liquid having a discharge opening in the lower portion of the container below the level of the liquid, said sealed container being capable of maintaining a vacuum;
   b. a conduit having an inlet connected to said discharge opening in said container and a discharge end positioned at a lower elevation opening to atmosphere;
   c. the discharge end of said conduit being formed with opening restricting means, said restricting means including pressure relief means;
   d. a control member mounted for free movement within said conduit and having an overall cross sectional area dimensioned somewhat smaller than the cross sectional area of said conduit for close fitting relation with the inside walls of said conduit and having a cross sectional area sufficiently large to be constrained by said restricting means from separating from the discharge end of said conduit;
   e. said inner walls of said conduit and the surface of said control member being dimensioned for producing a meniscus therebetween when said control member is at rest, and for normally causing liquid to flow therebetween only when said control member is moving by being manually forced toward said inlet and away from said discharge means;
   f. means returning said control member to said discharge end when not manually forced toward said inlet;
   g. said pressure relief means having means spacing said control member from a portion of said restricting means to prevent a mechanical liquid seal therebetween; and
   h. the control member effectively normally preventing leakage of liquid from said container and conduit, except upon demand of a small animal, by the combination of said vacuum within said sealed container and the surface tension between the surface of said control member and the inside surface of said restricting means.

2. A demand delivery liquid pump dispensing device for small animals as described in claim 1 comprising:
   a. said control member return means consisting of a control member having a weight so that the control member will return to the discharge end by gravity force.

3. A demand delivery liquid pump dispensing device as described in claim 2 comprising:
   a. said control member is a spherical member dimensioned for free rolling movement within said conduit.

4. A demand delivery pump device as described in claim 1 comprising:
   a. said pressure relief means consisting of the discharge end of said conduit having a circular restricted opening and also having crenulations in the periphery of said opening.

5. A demand delivery pump device as described in claim 1 comprising:
   a. said pressure relief means consisting of spaced indentations positioned around the periphery of a cross sectionally reduced area at the discharge end of said conduit.

6. A pump device as described in claim 1 comprising:
   a. said conduit discharge portion being inclined at an angle to the horizontal.

7. A pump device as described in claim 1 comprising:
   a. said conduit having a restriction in its inlet end preventing movement of the control member into the liquid container.

8. A pump device as described in claim 1 comprising:
   a. said control member being dimensioned to protrude beyond the end of the discharge end of said conduit.

9. A pump device as described in claim 1 comprising:
   a. said opening restricting means consisting of members integral with the end of the conduit curving inwardly so that the control member will contact said members without wedging.

* * * * *